J. W. KENEVEL.
VEHICLE SPRING SUPPORT.
APPLICATION FILED MAY 12, 1913.
1,148,590.
Patented Aug. 3, 1915.
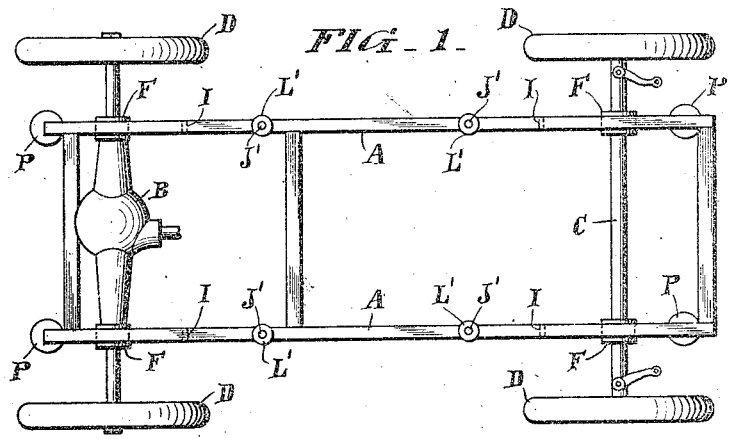
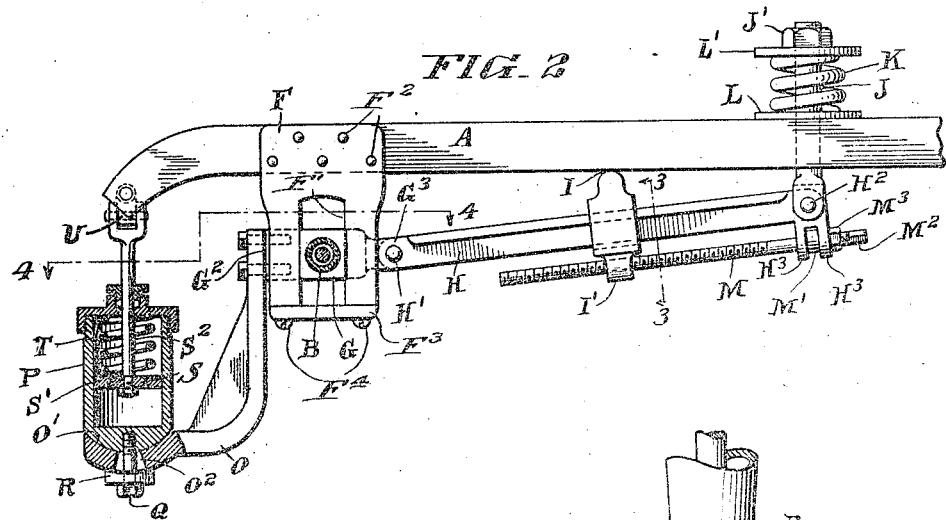
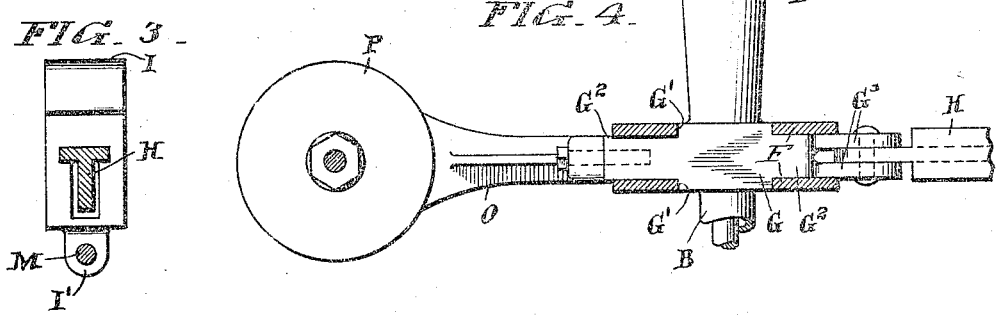
WITNESSES
INVENTOR
BY
ATTORNEY

UNITED STATES PATENT OFFICE.

JEANNOT W. KENEVEL, OF PHILADELPHIA, PENNSYLVANIA.

VEHICLE SPRING-SUPPORT.

1,148,590.

Specification of Letters Patent. Patented Aug. 3, 1915.

Application filed May 12, 1913. Serial No. 766,925.

*To all whom it may concern:*

Be it known that I, JEANNOT W. KENEVEL, a citizen of the United States of America, residing in the city and county of Philadelphia, in the State of Pennsylvania, have invented a certain new and useful Improvement in Vehicle Spring-Supports, of which the following is a true and exact description, reference being had to the accompanying drawings, which form a part thereof.

My present invention consists in a novel spring supporting arrangement for vehicles, such as automobiles and motor trucks, devised with the primary object in view of providing a simple, effective and relatively inexpensive construction for the purpose specified; and with the further object in view of permitting an easy and ready adjustment of the spring supporting means to thereby vary the tensions of the springs when desirable, as may be the case, for instance, on changes in the weight of the load carried by the vehicle.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated a form in which my invention may be embodied.

Of the drawings: Figure 1 is a plan of a portion of the frame work and running gear of a vehicle equipped with my invention; Fig. 2 is an elevation on a larger scale than Fig. 1 of a portion of the apparatus shown in Fig. 1; Fig. 3 is a partial section on the line 3—3 of Fig. 2; and Fig. 4 is a partial sectional plan on the line 4—4 of Fig. 2.

In the drawings A represents portions of the frame work of the vehicle body. As shown, the parts A are side frame members such as are commonly employed in automobiles.

B represents the rear axle, and C the front axle, and D the wheels of the vehicle. Each axle is provided at each end with an enlargement or cross head G, formed at two opposite sides with ribs $G'$ working in guide slots $F'$ formed in a corresponding pair of brackets F, and at its other sides with ribs $G^2$ working between the corresponding brackets F. Each pair of brackets F is secured to the corresponding frame member A as by rivets $F^2$. Each bracket F may advantageously be connected at its lower end to the lower end of the other bracket of the pair or by the plate $F^3$ and bolts $F^4$. Each cross head axle portion G may be formed integrally with the axle proper to which it pertains or it may be separable from but rigidly attached to the axle. To each cross head part G is pivotally connected one end of a corresponding lever H. As shown in the drawing each part G is formed with integral ears $G^3$, between which the corresponding lever H is pivotally connected by the pivot pin or bolt $H'$. At its opposite end each lever member H is pivotally connected as by the pin $H^2$ to a bolt J which passes upward through the corresponding side frame member A and through a helical spring K the lower end of which bears against a washer or spring support L resting on the frame member A, while the upper end of the spring bears against a washer $L'$ which is engaged at its upper side by a nut $J'$ threaded on the upper end of the bolt J. Provisions are made for a fulcrum bearing against the corresponding frame member A, of each lever H at some point between the ends of the latter. The provisions for this purpose in the form shown in the drawings comprise a fulcrum block I mounted on the lever H and adjustable along the lever in the direction of the length of the latter. In the construction shown each block I is formed at its under side with an ear $I'$ having a threaded passage through it receiving the threaded portion of a shaft M. The shaft M also passes through apertured ears $H^3$ formed for the purpose on one end of the corresponding lever H, and the shaft M has a collar $M'$ received between the ears $H^3$ and preventing movement of the shaft M in the direction of its length relative to the lever H. The shaft M is shown as having a squared end $M^2$ to which a wrench may be applied to rotate the shaft.

$M^3$ represents a lock nut by which the shaft M may be locked against rotation.

With the arrangement described the shaft M forms a simple and effective device for securing the corresponding fulcrum block I to its lever H in any desired relative adjustment, and for moving the fulcrum block I along the lever when a different adjustment is desired.

With the arrangement described it will be apparent that the resilient portions of the connections by which the vehicle body is supported from the axles are the helical springs K which are inherently inexpensive in type and size; and the springs for an ordinary automobile may well be small enough and light enough, to make it entirely feasible to carry one or more springs beneath one of the seats of the automobile. The ready adjustability of the fulcrum blocks I along the levers H on which they are mounted makes it entirely feasible to adjust one or more of these blocks and thereby vary the tensions of the corresponding springs K, whenever changes in the loading or the conditions of the road may make these desirable; for instance, in the case of an ordinary automobile, it may well be desirable and entirely feasible to change the adjustment of the blocks I when the number or weight of passengers carried changes.

Advantageously, I may employ in conjunction with the spring supporting mechanism proper suitable shock absorbing devices. For instance, I may connect each end of each side frame A to a suitable shock absorbing device attached to the corresponding axle end. For this purpose, in the particular construction illustrated, I secure a bracket O to the side of each axle cross head part G opposite to that from which the ear G³ projects. The bracket O is formed with a spherical seat O' for the correspondingly shaped lower end of a dash pot cylinder P. The latter is held against movement out of its seat by a bolt Q which passes through an enlarged opening O² formed in the bracket O and has its head bearing against a suitably shaped washer R the upper surface of which is concaved to correspond to the curvature of the surface O' and fits against the convex under side of the bracket O. In the dash pot cylinder works a piston S formed with one or more restricted orifices S' to permit the slow leakage through the piston of air or oil, and a spring T may well be mounted in the cylinder to oppose the upward movement and hasten the downward movement of the piston. The stem S² of the piston S is connected by a swivel connection U of common form to the end of the frame.

With the spring support and shock absorbing arrangement described all desirable resiliency in the supporting means is attained, while at the same time any side swaying movement of the vehicle body relative to the running gear is restricted as is desirable. The character of the spring support provided makes it possible to dispense with pneumatic tires in many cases where they would otherwise be necessary, and when these tires are retained permits of the tires being inflated to higher pressures than would otherwise be permissible. This is of advantage both directly with respect to the cost and upkeep of the tires, and also indirectly as it reduces the tendency to skid. The tendency to skid is also reduced by the reduction in side swaying had with the use of the invention.

While in accordance with the provisions of the statutes I have illustrated and described one form of my invention, it will be apparent to those skilled in the art that changes may be made in the form of the apparatus described without departing from the spirit of my invention, and that under some conditions certain features of my invention may be used without a corresponding use of other features.

Having now described my invention, what I claim as new and desire to secure by Letters Patent, is:

1. In a vehicle, the combination with the body frame thereof and a supporting axle, of guides carried by said frame in which said axle is mounted, said guides permitting vertical but preventing endwise movement of said axle relative to said frame, a lever having an adjustable fulcrum bearing between its ends against said frame and pivoted at one end to said axle, and a spring connecting the other end of said lever to said frame.

2. In a vehicle, the combination with the body frame thereof and a supporting axle, of guides carried by said frame in which said axle is mounted, said guides permitting vertical but preventing endwise movement of said axle relative to said frame, a lever pivoted at one end to said axle, a spring by which the other end of said lever is connected to said frame, a fulcrum member interposed between said frame and said lever and means for securing said member in adjusted positions along the length of said lever.

3. In a vehicle, the combination with the body frame thereof and a supporting axle, of guides carried by said frame in which said axle is mounted, said guides permitting vertical but preventing endwise movement of said axle relative to said frame, a lever pivoted at one end to said axle, a spring by which the other end of said lever is connected to said frame, a fulcrum member interposed between said frame and said lever, means for securing said member in adjusted positions along the length of said lever, and shock absorbing devices connecting each end of each axle to said frame.

4. In a vehicle, the combination of one or more supporting axles provided each adjacent each end with a cross head portion, a body frame provided with guideways for said cross head portions in which the latter are vertically movable, but are held against endwise movement, a lever for each cross head portion pivotally attached thereto at one end and a spring for and connecting the opposite end of each lever to the frame, and a fulcrum member interposed between each lever and the frame and adjustable along the lever.

5. In a vehicle, the combination of one or more supporting axles provided each adjacent each end with a cross head portion, a body frame provided with guideways for said cross head portions in which the latter are vertically movable, but are held against endwise movement, a lever for each cross head portion pivotally attached thereto at one end and a spring for and connecting the opposite end of each lever to the frame, a fulcrum member interposed between each lever and the frame and adjustable along the lever, and a shock absorbing device connected between each cross head portion and the frame.

JEANNCT W. KENEVEL.

Witnesses:
ARNOLD KATZ,
D. STEWART.